United States Patent
Marsh et al.

(10) Patent No.: US 6,647,934 B2
(45) Date of Patent: *Nov. 18, 2003

(54) UNIFIED ROTARY FLOW CONTROL VALVE FOR INTERNAL COMBUSTION ENGINE COOLING SYSTEM

(75) Inventors: Gregory Alan Marsh, Erie, PA (US); Peter Loring Valentine, Erie, PA (US)

(73) Assignee: General Electric Company, Erie, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/968,648

(22) Filed: Oct. 1, 2001

(65) Prior Publication Data

US 2003/0079728 A1 May 1, 2003

(51) Int. Cl.[7] .................................................. F01B 11/08
(52) U.S. Cl. ................ 123/41.33; 123/563; 137/625.41; 137/625.46; 60/599
(58) Field of Search .................. 123/563, 41.44, 123/41.33, 41.31, 190.4; 60/599; 137/625.41, 625.46

(56) References Cited

U.S. PATENT DOCUMENTS

| | | | | |
|---|---|---|---|---|
| 3,134,371 A | * | 5/1964 | Crooks ........................ | 123/563 |
| 3,397,684 A | * | 8/1968 | Scherenberg ................ | 123/563 |
| 3,752,132 A | * | 8/1973 | Bentz et al. ................. | 123/563 |
| 4,165,763 A | * | 8/1979 | Hough ................... | 137/625.41 |
| 5,201,285 A | * | 4/1993 | McTaggart ................ | 123/41.31 |
| 5,415,147 A | | 5/1995 | Nagle et al. ................. | 123/563 |
| 5,941,206 A | * | 8/1999 | Smith et al. ............. | 123/190.4 |
| 6,098,576 A | | 8/2000 | Nowak, Jr. et al. ...... | 123/41.33 |
| 6,145,497 A | * | 11/2000 | Kervagoret et al. ........ | 123/563 |
| 6,175,934 B1 | | 1/2001 | Hershey et al. | |
| 6,196,167 B1 | | 3/2001 | Marsh et al. ............. | 123/41.31 |
| 6,216,066 B1 | | 4/2001 | Goebel et al. | |
| 6,230,668 B1 | | 5/2001 | Marsh et al. ............. | 123/41.44 |

* cited by examiner

Primary Examiner—Thomas Denion
Assistant Examiner—Thai-Ba Trieu
(74) Attorney, Agent, or Firm—Carl A. Rowold, Esquire; Terry M. Sanks, Esquire; Beusse Brownlee Bowdoin & Wolter, P.A.

(57) ABSTRACT

An enhanced split cooling system and method for a turbocharged internal combustion engine including a liquid cooled turbocharger 19 and an engine liquid coolant jacket 18, the system comprising a coolant pump 12 for pumping coolant from a coolant storage tank 16 in heat exchange relationship with the engine jacket 18 and turbocharger 19; an oil cooler 32 having coolant input and output lines; a valve assembly 74, 83 including a multi-port rotary valve actuated by a single actuator; a first coolant output line connected for conveying coolant from the engine to the valve assembly 74, 83; a radiator 22 connected via a second coolant line for receiving coolant from the valve assembly 74, 83 and having a coolant outflow line to return coolant to the coolant tank 16; an intercooler 28 operatively associated with the turbocharger 19 for passing the coolant in hear exchange relationship with compressed air in the turbocharger 19; a lube oil subcooler 46 coupled by a third coolant flow line to receive coolant from the radiator 22 and having a coolant outflow line selectively couplable through the valve assembly 74, 83 to the oil cooler 32 and the coolant tank 16; an intercooler subcooler 24 coupled by a fourth coolant flow line to receive coolant from the oil subcooler 46 and having a coolant outflow line selectively couplable through the valve assembly 74, 83 to the coolant tank 16 and the intercooler 28; and the valve assembly 74, 83 being independently operable for selectively directing coolant flow through the radiator 22 and subcoolers 46, 24 and the oil cooler 32 and intercooler 28 as a function of engine operating temperature.

24 Claims, 6 Drawing Sheets

UNIFIED ROTARY FLOW CONTROL VALVE FOR INTERNAL COMBUSTION ENGINE COOLING SYSTEM

BACKGROUND OF THE INVENTION

The present invention relates to a cooling system for high power internal combustion engines, and more particularly, to a unified rotary flow control valve for use in a cooling system used in a diesel engine powered rail traction vehicle.

Cooling systems for internal combustion engines, such as diesel engines used in locomotives and off highway vehicles, are known in the art for the purpose of maintaining engine and lubricating oil temperatures within desired operating ranges. Turbocharged engines are also known to utilize cooling systems for conditioning the combustion inlet air after it is compressed in a turbocharger. For example, it is believed that U.S. Pat. No. 5,415,147 ("the '147 patent"), assigned to the assignee of the present invention, describes a temperature regulating system containing turbocharged internal combustion engine having one coolant fluid pump and one or more flow paths where coolant fluid may be directed depending on the engine operating conditions. The temperature regulating system of the '147 patent defines three modes of operation as follows:

Mode 1: Used when coolant temperatures are highest, such as when the engine is at the highest power levels and/or when the highest ambient air temperatures are encountered. Entire hot coolant outflow from the engine is directed to the radiator/subcooler. Coolant passing through the subcooler is used to cool the engine intake air in the intercooler.

Mode 2: Used when engine coolant temperature is high enough to warrant cooling but heating of the intake air is desired to obtain optimal engine operation. The radiator/subcooler are used to cool only a portion of the hot coolant outflow from the engine. The remainder is used to heat the engine intake air in the intercooler.

Mode 3: Used when the heat demand on the engine is lowest, such as at low power loads and/or cold ambient air temperatures. None of the coolant outflow from the engine is cooled in the radiator, but some of this heated coolant is used to heat the engine intake air in the intercooler. The radiator and subcooler are drained in this mode.

Particular flow paths for each of the three Modes described above are disclosed in the '147 patent along with the flow control system valve requirement that is required to implement this cooling flow control system. The flow control system includes a two position, three way "T-port", rotary valve shafted to an external air powered actuator and an on-off butterfly type valve for drainage of a radiator inlet piping (collectively V1 as illustrated in Table 1), and a second two-position three-way "L-port" valve shafted to an external air powered actuator and its associated second on-off butterfly valve (collectively V2 as illustrated in Table 2) for drainage of the subcooler outlet piping. Table 1, provided below, illustrates the possible combination of valve positions for the three way valves, with the flow ports of the valves designated as A, B, and C. Three of the four combinations are used for implementing Modes 1, 2, and 3 described above, and the fourth combination is unused in the prior art embodiments. The abbreviations used in Table 1 are as follows: Eng is engine; W/T is water tank; I/C is intercooler; Rad is radiator; and S/C is subcooler.

TABLE 1

Cooling System Mode vs. Valve Position

| Mode | V1 T-Port 3-way | V1 B'Fly 2-way | V2 L-Port 3-way | V2 B-Fly 2-way | Flow Path |
|---|---|---|---|---|---|
| 3 | C to B | Open | C to B | Open | Eng to W/T & I/C Rad & S/C to W/T |
| 2 | C to A | Closed | C to B | Open | Eng to Rad & I/C, S/C to W/T |
| 1 | C to A | Closed | A to B | Closed | Eng to Rad, S/C to I/C |
| X | C to B | Open | A to B | Closed | Not Used |

U.S. Pat. No. 6,098,576 (hereinafter "the '576 patent"), assigned to the assignee of the present invention, provides for a lower lube oil temperature for given high temperature ambient air conditions in a diesel electric locomotive with an enhanced split cooling system. The '576 patent extended the split cooling concept of the '147 patent by including a turbo charger, an oil cooler and an oil subcooler. Like the '147 patent, the '576 patent included two valve assemblies that are used for coolant flow control. While the first valve assembly in the '576 patent is essentially identical to that used in the '147 (identified as V1 in Table 2), the second assembly is considerably more complex, having eight ports in the rotary valve instead of three (identified as V2 in Table 2). However, even though the '576 patent has several benefits over the '147 patent, the increase in components increases the costs of parts as well as the costs of assembling the cooling system and increases the costs of maintenance costs over the life of the system. Furthermore, the reliability of the cooling system is lessened because of a higher parts count.

Like the '147 patent, in the '576 patent four modes are possible but only three modes are utilized in practice. The modes are as follows:

Mode 1: A normal engine operating mode in which coolant is used for cooling and the entire outflow from the engine is passed to the radiator. A portion of the coolant from the radiators is returned to the coolant tank while another portion is passed to the lube oil subcoolers. A portion of the lube oil subcooler's coolant outflow is sent to the lube oil cooler while another portion of the outflow is sent to the intercooler subcoolers and then to the intercoolers.

Mode 2: Used at lower operating temperatures than Mode 3, wherein said hot coolant outflow from the engine is used to heat the engine intake air in the intercooler, some is used to heat the engine lube oil in the lube oil cooler, and some coolant flows to the radiators and is returned to the coolant tank.

Mode 3: Used at start-up or in extremely cold weather when engine heat is needed to heat the engine intake air in the intercooler and to heat the engine lube oil in the lube oil cooler.

Particular flow paths for each of the three modes described above are disclosed in the '576 patent along with the flow control system valve configuration requirement that is needed to implement this cooling flow control system. The flow control system includes a three way rotary valve shafted to an external air powered actuator and an on-off butterfly type valve for drainage of a radiator inlet piping, and a four-way rotary valve shafted to an external air powered actuator and an associated second on-off butterfly valve for drainage. Table 2, provided below, illustrates the possible combination of valve positions for the valves, with the actuators for the first valve labeled 1 and the second valve labeled 2, flow ports at the three-way valve assembly labeled A–C, and the flow ports at the four-way valve assembly labeled A–H. Three of the four combinations are used for implementing Modes 1, 2, and 3 described above, and the fourth combination is unused in the prior art embodiments.

TABLE 2

Enhanced Cooling System Mode vs. V1 and V2 Position

| MODE | V1 3-Way B'Fly | V1 2-Way B'Fly | V2 3-Way T-Port | V2 2-Way B'Fly | V2 IC 4-Way | V2 O/C 4-Way | V2 B'Fly |
|---|---|---|---|---|---|---|---|
| 3 | 2 | 1 | C to B | Open | C to B | G to F | Open |
| Flow Description: Positions of Engine Outflow go to the Coolant Tank, Oil Cooler and Intercooler. Radiators, Oil Cooler Subcoolers and Intercooler Subcoolers drain to the Coolant Tank |||||||||
| 2 | 1 | 1 | C to A | Closed | C to B A to D | G to F E to H | Open |
| Flow Description: All Engine Outflow goes to the Radiators, Subcoolers and Coolant Tank. Another Portion of Engine Outflow goes to the Oil Cooler and Intercoolers. |||||||||
| 1 | 1 | 2 | C to A | Closed | A to B C to D | E to F E to H | Closed |
| Flow Description: All Engine Outflow goes to the Radiators. Radiators drain to the Coolant Tank and Oil Cooler Subcoolers. Oil Cooler Subcoolers drain to the Oil Cooler and Intercooler Subcoolers. Intercooler Subcoolers drain to the Intercoolers. |||||||||
| X | 2 | 2 | C to B | Open | A to B C to D | E to F G to H | Closed |
| Flow Description: Not used |||||||||

A disadvantage of the prior art discussed above is the potential for coolant leaks. Having two rotary valves doubles the chance of a coolant leak since either valve can develop a leak. Still another disadvantage of the prior art discussed is the potential for air leaks. Pneumatic actuators with pressurized stem seals are often used to change valve positions. Having two rotary valves doubles the chance of air leaks since each rotary valve requires its own pneumatic actuator.

SUMMARY OF THE INVENTION

Thus there is a need for a cooling system for use with an internal combustion engine where only one valve and actuator are used. There is a need to reduce the cost of fabricating and assembling the cooling system. There is also a need to reduce the maintenance costs and improve the reliability of the system by reducing the number of components used in the cooling system. Another need exists for using a valve assembly that occupies a minimum physical space and when enlarged to regulate other fluids, continues to occupy a minimum physical space. Another need exists for a valve assembly that can be integrated into an existing engine without requiring additional space.

Towards these ends, there is a need for a system and method for a turbo-charged internal combustion engine for a locomotive or off highway vehicle where the system comprises a coolant storage tank having an inlet and an outlet, a coolant pump associated with the tank operable to circulate coolant through the system, an engine coolant jacket in heat transfer relationship with the engine having an inlet in fluid communication with the tank outlet and an outlet, a combustion air intercooler having an inlet, a radiator having an inlet and an outlet, and a single flow rotary control valve. The single flow rotary control valve is connected in fluid communication with the coolant jacket outlet, intercooler inlet, radiator inlet, radiator outlet, and the tank inlet. The single flow rotary control valve is controllable to operate in a plurality of flow connection modes for selectively regulating a flow of coolant throughout the jacket, intercooler, radiator and tank, and thus a temperature of said engine under varying engine operating and environmental conditions.

The system further comprises a liquid cooled turbo charger having an inlet in fluid communication with the tank outlet and an outlet, an intercooler subcooler having a coolant input and output, a lube oil cooler having a coolant input and output, and a lube oil subcooler having a coolant input and output. The single flow rotary control valve is further connected in fluid communication with the oil cooler inlet, lube oil subcooler output, intercooler subcooler inlet and intercooler subcooler output. The single flow rotary control valve is controllable to operate in a plurality of flow connection modes for selectively regulating a flow of coolant throughout the coolant jacket, turbo charger, intercooler, radiator, tank, oil cooler, oil subcooler, and intercooler subcooler and thus a temperature of the engine under varying engine operating and environmental conditions.

BRIEF DESCRIPTION OF THE DRAWINGS

The invention will be better understood when consideration is given to the following detailed description taken in conjunction with the accompanying drawings in which.

DETAILED DESCRIPTION OF THE INVENTION

Before describing in detail the particular system and method for providing a unified rotary flow control valve for an internal combustion engine cooling system, it should be observed that the present invention resides primarily in a novel combination of components and steps related thereto. Accordingly, the system and method steps have been represented by conventional elements in the drawings, showing only those specific details that are pertinent to the present invention, so as not to obscure the disclosure with structural details that will be readily apparent to those skilled in the art having the benefit of the description herein. Additionally, the phraseology and terminology employed herein are for the purpose of description and should not be regarded as limiting.

In order to understand the improvements offered by the present invention, it is useful to analyze the heat regulating systems as disclosed in prior art U.S. Pat. No. 5,415,147 and U.S. Pat. No. 6,098,576. The '147 patent relates to a cooling system using two valve assemblies, and the '576 patent relates to an enhanced split cooling system. Like structures are numbered consistently in the various figures.

Figure 1:
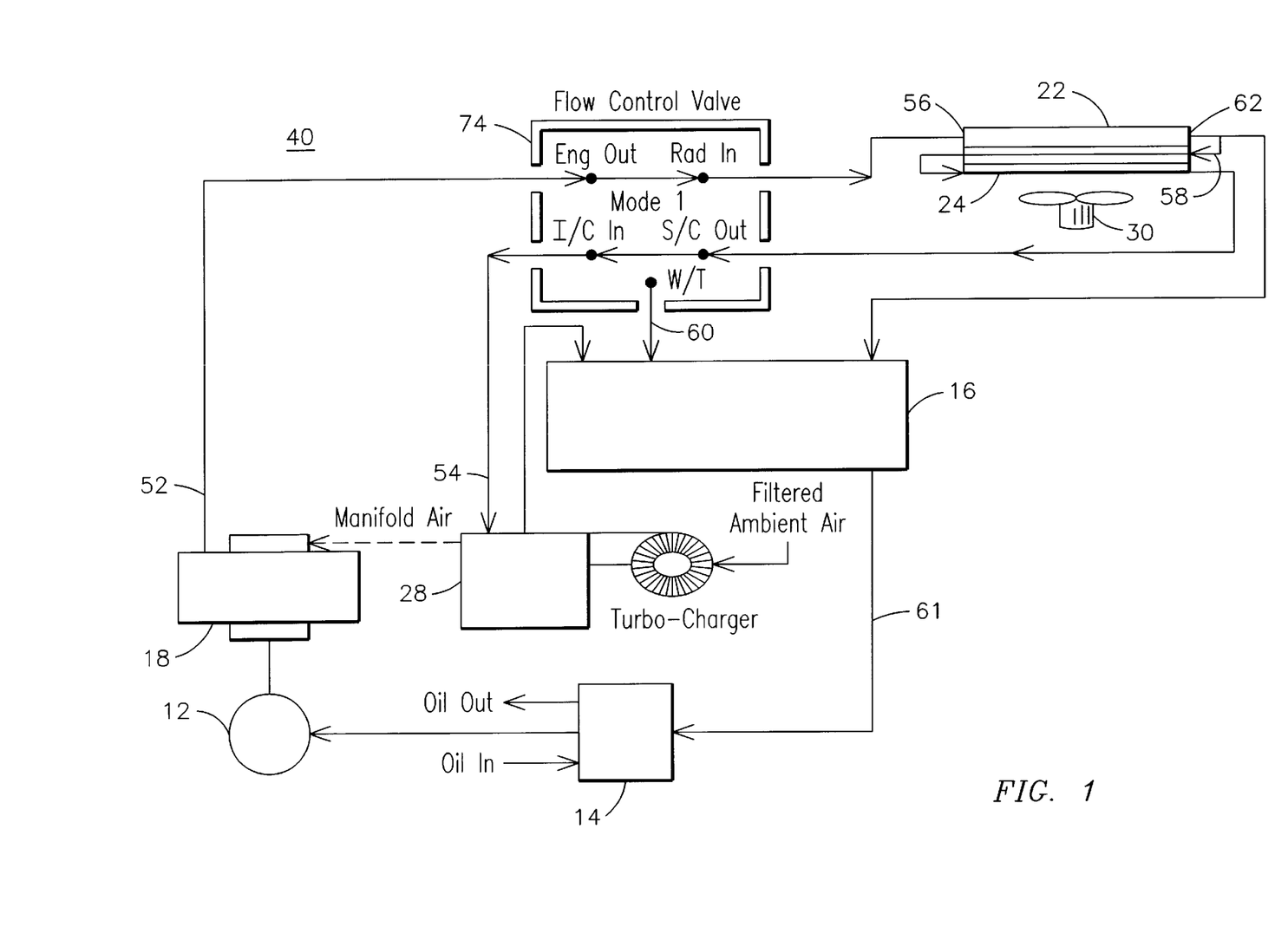
FIG. 1 is a schematic representation illustrating coolant flow within the cooling system with a rotary valve assembly in Mode 1.
Figure 2:
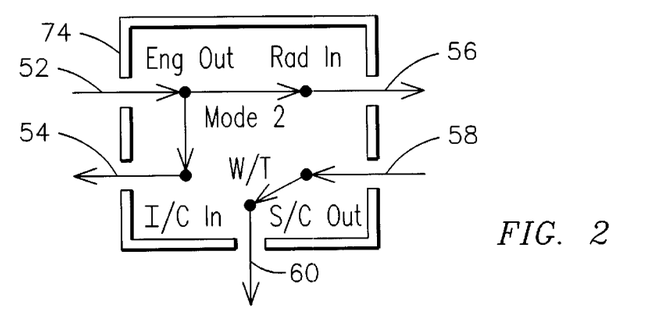
FIG. 2 is a schematic representation illustrating coolant flow through a rotary valve assembly in Mode 2.
Figure 3:
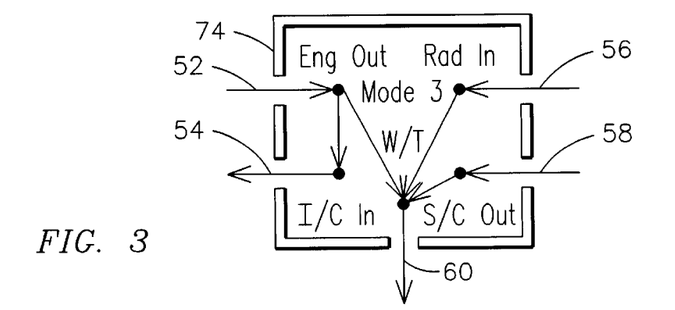
FIG. 3 is a schematic representation illustrating coolant flow through a rotary valve assembly in Mode 3.

FIGS. 1–3 illustrate the flow paths of the three operational modes of a heat regulating system originally disclosed in the '147 patent in the present invention by replacing the two rotary valve assemblies with a single rotary valve assembly. Explanation of the abbreviations contained in FIGS. 1–3 is as follows: ENG is engine; RAD is radiator, I/C is intercooler, S/C is subcooler, and W/T is water tank or coolant tank. FIG. 1 illustrates the cooling system aligned to operate in Mode 1 as discussed above. Modes 1–3 can be achieved by operating the rotary flow control valve 74 to change the interconnections among the various system components as illustrated in FIG. 1–3. FIG. 1 discloses a pump 12, oil cooler 14 with an inlet and output, coolant tank 16 with an inlet and output, coolant jacket 18 with an inlet and output, rotary flow control valve assembly 74, a subcooler 24 with an inlet and output, intercooler 28 with an inlet, and a radiator 22 with an inlet and output.

Referring to FIG. 1, the flow control valve has connections to the outlet 52 of the engine coolant jacket 18, to the inlet 54 of the intercooler 28, to the inlet 56 of the radiator 22, to the outlet 58 of the subcooler 24, and to the inlet 60 of the coolant tank 16. The coolant tank 16 outlet is in fluid communication with the coolant jacket 18, in this embodiment, through the oil cooler 14 and pump 12. Also note that the outlet 62 of the radiator 22 is connected to the rotary flow control valve 74 through the subcooler 24, although in some embodiments it may be connected directly if no subcooler is provided. In FIG. 1, the rotary flow control valve 74 is illustrated in a first position, or Mode, where the coolant jacket 18 outlet 52 is connected to the radiator 22 inlet 56, and the subcooler 24 outlet 58 is connected to the intercooler 28 inlet 54. In this position the water, or coolant, tank 16 inlet 60 connection is isolated and water returns to the water tank 16 from the radiator outlet 62 and from the subcooler 28.

FIG. 2 is a schematic diagram of the unified rotary flow control valve of FIG. 1 but configured in a second position, or Mode, in order to provide for Mode 2 operation of the coolant system. In FIG. 2, the rotary flow control valve 74 provides a second flow path for the system that connects the water jacket 18 outlet 52 to both the radiator 22 inlet 56 and the intercooler 28 inlet 54, and connects subcooler 24 outlet 58 to the water tank 16 inlet 60.

FIG. 3 is a schematic diagram of the unified rotary flow control valve 74 of FIG. 1 configured in a third position, or Mode, in order to provide for Mode 3 operation of the coolant system. In FIG. 3, the rotary flow control valve 74 provides a third flow path for the system that connects the coolant jacket 18 outlet 52 to both the intercooler 28 inlet 54 and the coolant tank 16 inlet 60 in order to provide heat to the incoming combustion air. The rotary flow control valve 74 also connects both the radiator 22 inlet 56 and the subcooler 24 outlet, or exit, 58 to the coolant tank 16 inlet 60 to provide for draining of the radiator 22 and subcooler 24.

Figure 4:
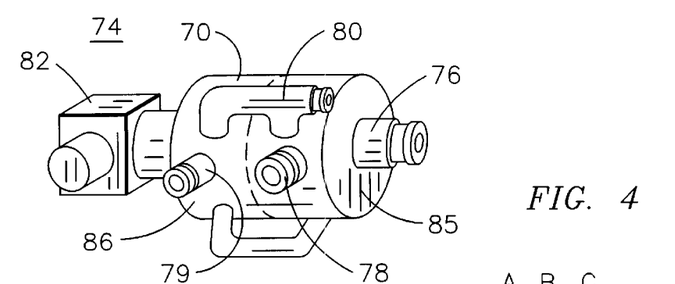
FIG. 4 is a perspective view of a first side of a rotary valve assembly as embodied in the present invention.
Figure 5:
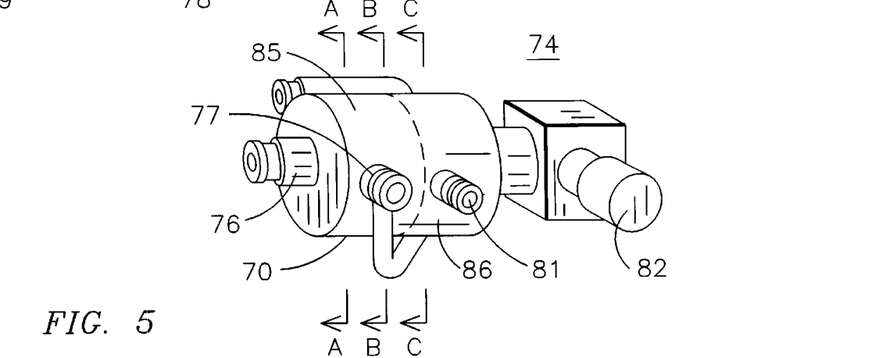
FIG. 5 is a perspective view of a second side of the rotary valve assembly as contemplated by the present invention.
Figure 6:
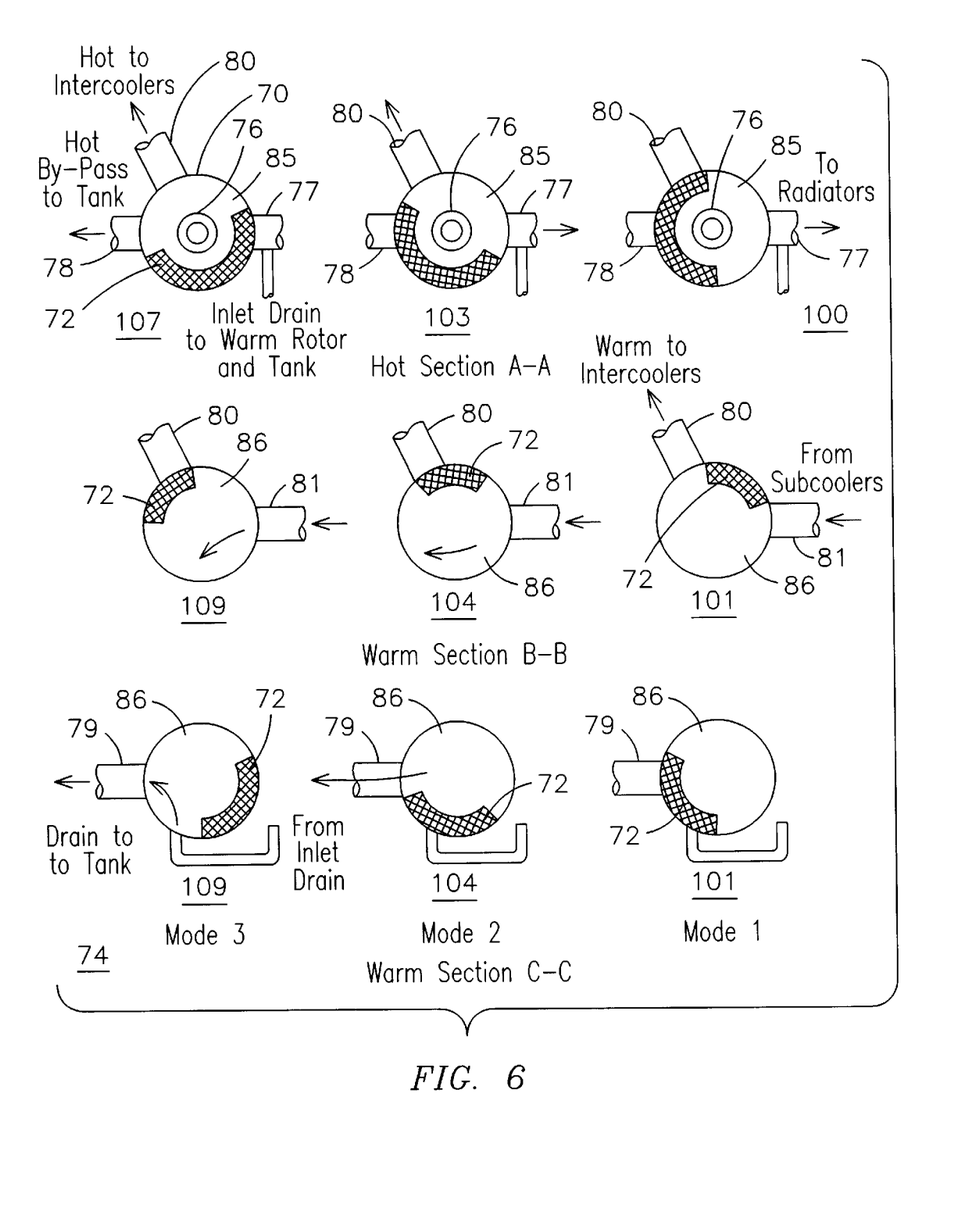
FIG. 6 is a matrix of cross-sectional views taken along sections A—A, B—B and C—C of the valve assembly of FIG. 5.

FIGS. 4–6 illustrate various views of an embodiment of an improved flow control valve contemplated by the present invention. The illustrated embodiment of the rotary flow control valve is a unified rotary valve 74 containing an outer cylinder 70 and a rotatable rotor 72. The rotor 72 is a two-section, three-position rotary valve assembly. FIGS. 4 and 5 illustrate perspective views of opposite sides of the outer cylinder 70 of the rotary valve 74. The rotary valve assembly 74 has two sections, a hot section 85 and a warm section 86. Inlets 76, 81 and outputs 77, 78, 79, 80 are providing for directing coolant flow from the coolant jacket 18, to the radiator 22, to the tank 16, to the intercooler 28, and from the subcooler 24. The assembly 74 is connected to an actuator 82. In a preferred embodiment, the actuator 82 is a rotary actuator.

FIG. 6 illustrates the three positions the rotary valve assembly is placed in correspondence to Modes 1–3. FIG. 6 illustrates the position of the rotor in the hot section 100, 103, 107 and the warm section 101, 104, 109. In Mode 1, in the hot section 100, hot water from the coolant jacket 18 enters at the center inlet 76 and is directed to the radiator 22 inlet 77. The rotor 72 blocks coolant from flowing to the tank 16 through its respective outlet 78 and the intercooler 28 through its respective outlet 80. The radiator 22 drains to the coolant tank 16 and to both subcoolers (not shown). As shown in the illustration of the warm section 101, coolant from the subcooler 24 returns to the warm section 86 of the valve 74 through the inlet 81 and is directed to the intercooler 28 through outlet 80.

In Mode 2, in the hot section 103, hot coolant from the jacket 18 enters in the center inlet 76 and is split between the radiator 22 outlet 77 and the intercooler 28 outlet 80. Coolant from the radiator 22 drains to the tank 16 and the subcoolers (not shown). Coolant from the subcooler 24 returns to the warm section 86 of the valve 74 and is illustrated in 104, then flows to the tank 16 through the warm section drain 79.

In Mode 3, after the hot coolant enters through the center inlet 76 in the hot section 107, the water is split between the tank 16 and the intercooler 28. With the outlet 77 to the radiator 22 closed, the radiator 22 receives no coolant and drains completely to the tank 16 and to the subcooler 24. The subcooler 24 drains completely through the warm section 109 drain 79 along with the radiator 22 inlet line which enters the radiator 22 outlet of the warm section 86 through an exterior connection to the radiator outlet 77 of the hot section. In another preferred embodiment, this external connection to the radiator 22 inlet line may be made elsewhere than at the outlet on the valve 74.

Though not shown, in a preferred embodiment, bushings may be used at the rotor outer diameter to allow a comparatively loose fit between the rotor and the cylindrical housing while holding the two parts in concentric orientation. Other seals, such as lip seals and "split ring" seals may be used at the outer diameter of the rotor to limit port-to port leakage.

FIG. 6 further illustrates the internal rotor turning in two equal increments of 60 degrees to change from Mode 1, Mode 2, and Mode 3. It will be apparent to one skilled in the art that many variations of the internal rotor 72 are possible without changing the description of the coolant flows in Modes 1–3. In this configuration, a smaller valve body 70 diameter is possible. Other rotational increments may be used and the rotational increments between Mode 3 and Mode 2, and between Mode 2 and Mode 1, need not be equal. In other preferred embodiments, the rotor is mechanized to rotate either clockwise or counter clockwise.

Figure 7:
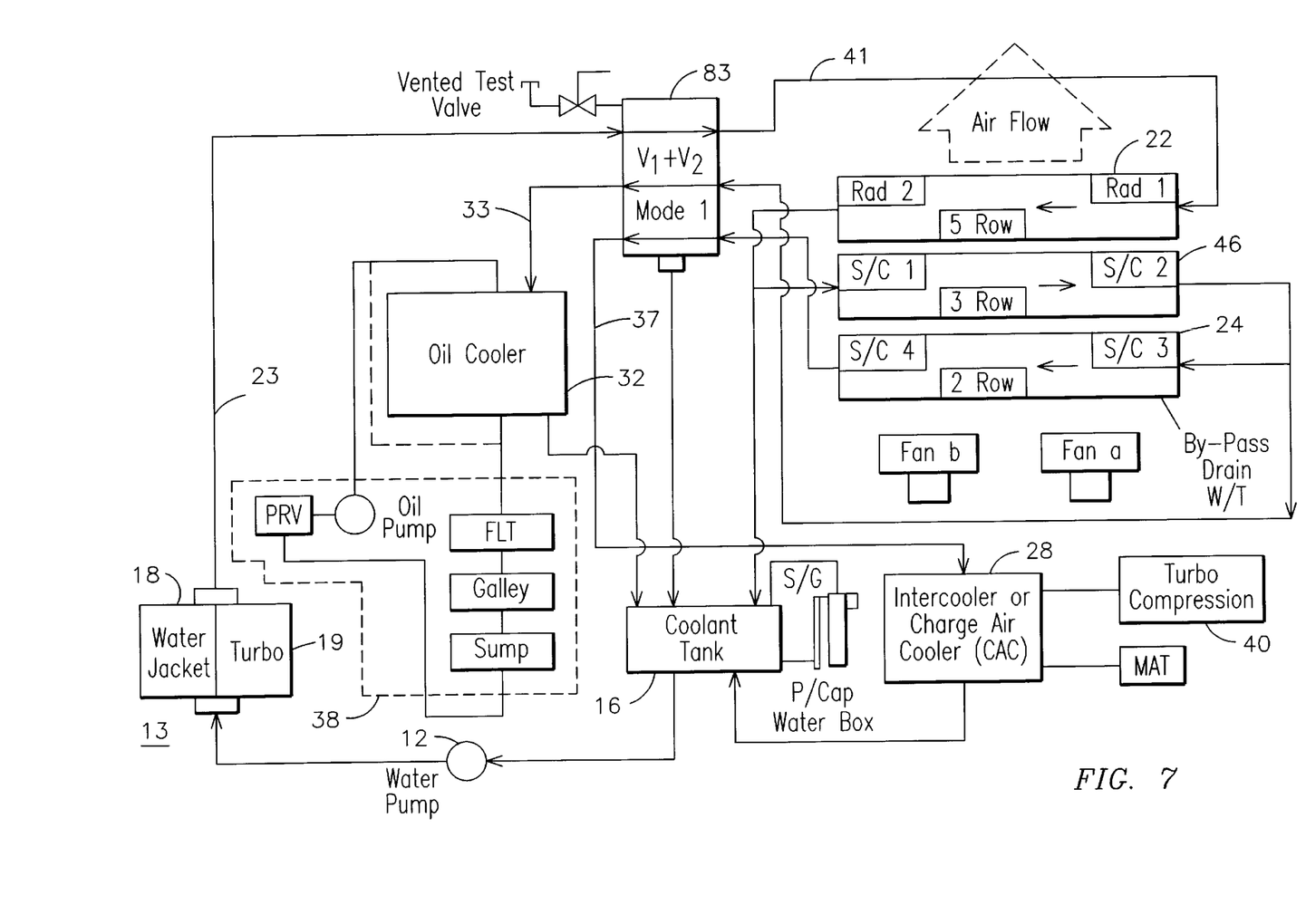
FIG. 7 is a schematic representation of an enhanced split cooling system operating in Mode 1 arranged in a manner contemplated by the present invention.
Figures 8, 9:
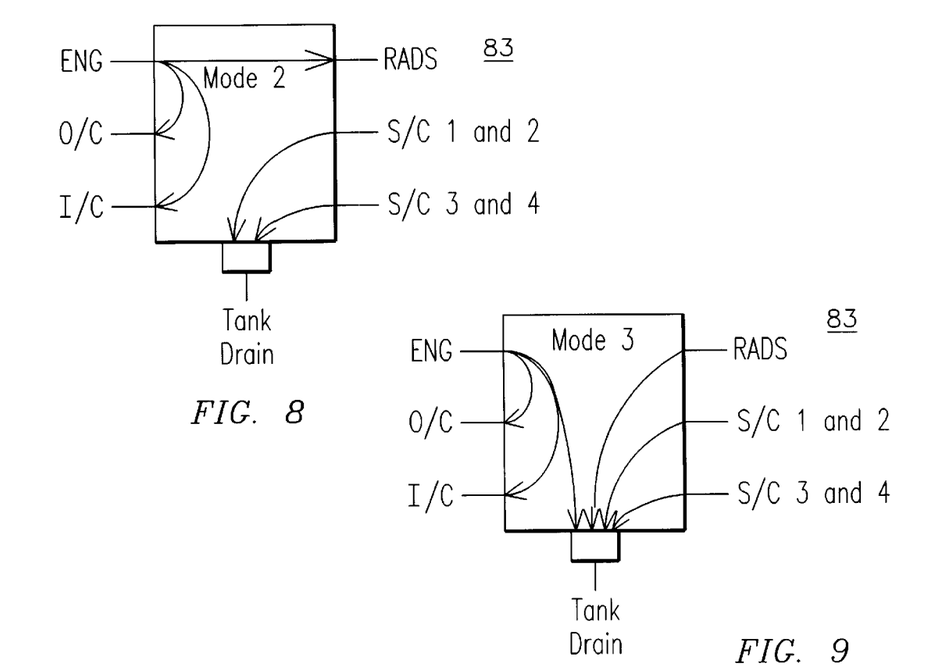
FIG. 8 is a schematic representation of a valve assembly for use in an enhanced split cooling system operating in Mode 2 arranged in a manner contemplated by the present invention.
FIG. 9 is a schematic representation of a valve assembly for use in an enhanced split cooling system operating in Mode 3 arranged in a manner contemplated by the present invention.

FIGS. 7, 8 and 9 are identical in structure to the invention disclosed in U.S. Pat. No. 6,098,576, incorporated by reference, with the only differences being the mode in which a unified, or single, valve assembly 83 is operating. Comparison of FIGS. 1 through 6 and Table 1 with FIGS. 7 through 13 and Table 2 illustrate that a single valve unit 83 may replace the multiple valves 26, 30 of the '576 Patent while performing the same functions. This new valve unit or assembly 83 is a single three-position multi-port rotary valve actuated by a single actuator (not shown). This valve assembly 83 results in a "wet/dry" cooling system with a single pump and a single control valve combination. Table 3 illustrates how the present invention decreases cost and improves reliability by reducing the number of parts, especially seals, which cost money to build and install, but which may cause valve failure in the event of excessive leakage.

TABLE 3

| Flow Control System Component | No. In Prior Art | No. In Invention |
| --- | --- | --- |
| Actuator Stem Air Seals (Dynamic) | 4 | 1 |
| Multi-port Valve Coolant Seals (Dynamic) | 2 | 1 |
| Butterfly Stem Coolant Seals (Dynamic) | 2–4 | 0 |
| Static Assembly Bolted Joints | 8 | 2 |
| Rack & Pinion or Scotch Yoke Actuator Mechanisms | 2 | 1 |
| Rotating Mechanical Joints | 8 | 2 |

FIG. 7 corresponds to Mode 1, FIG. 8 to Mode 2, and FIG. 9 to Mode 3. FIG. 7 illustrates the unified rotary valve assembly 83 in the enhanced split cooling system whereas FIGS. 8–9 are schematic representations of the unified rotary valve assembly 83 of FIG. 7 operating the Modes 2 and 3 respectfully. The directional flow arrows in each figure show the valve status.

As illustrated in FIG. 7, a coolant pump 12 pumps coolant from a coolant tank 16 to an engine 13 where the coolant is divided and one part is sent to the cylinders of the engine 13 via an engine water, or coolant, jacket 18 and the rest is sent to cool a bearing area of the turbochargers 19, i.e., cooling the mechanical components of turbocharger 19 which needs cooling due to heat from hot exhaust gas and hot compressed intake air. The two coolant streams then leave the engine 13 and turbocharger 19, which are generally bolted together, and rejoin as an output stream indicated by line 23. Line 23 may be a conventional type coolant piping.

As further illustrated in FIG. 7, the coolant, in line 23, passes through the valve assembly 83 and enters the radiator 22. The coolant exits the radiator 22 and is divided between flowing back to the coolant tank 16 and flowing to an oil subcooler 46. The coolant exits the oil subcooler 46 and is divided between flowing into an intercooler subcooler 24 and flowing into the valve assembly 83, and then through the lube oil cooler or plate heat exchanger (PHE) 32. In the PHE 32, the coolant passes in heat exchange relationship with lube oil pumped through the PHE 32 from the oil system 38. The coolant then flows back to the coolant tank 16. Fluid from the intercooler subcooler 24 flows through the valve assembly 83 and is fed to the intercooler 28. The intercooler 28 is used to cool the heated compressed air from the turbo compressor 40. While shown separately in the figure, it will be recognized by those skilled in the art that the air compressor 40 is part of the turbocharger 19 and that the intercooler 28 is physically mounted adjacent to the turbocharger 19.

As illustrated in FIG. 8, the coolant, through line 23, passes through the valve assembly 83 and is divided into three flows. A first flow feeds coolant to the radiator 22. A second flow feeds coolant to the PHE 32. A third flow feeds coolant to the intercooler 28. As also illustrated in FIG. 7, once the coolant leaves the radiators 22, it is divided to flow into either the coolant tank 16 or the oil subcooler 46. The coolant exits the oil subcooler 46 and is divided between flowing into an intercooler subcooler 24 and flowing into the valve assembly 83. All fluid flowing out of both the lube oil subcooler 46 and intercooler subcooler 24 are directed into the valve assembly 83 that then flows the coolant into the coolant tank 16.

As illustrated in FIG. 9, from single line 23 the coolant is passed into the valve assembly 83 which splits the coolant into three flows. A first flow directs the coolant to the plate heat exchanger (PHE) 32. A second flow directs the coolant to the intercooler 28. The third flow directs the coolant to the coolant tank 16. Though no coolant is flowing directly from the water jacket 18 and turbochargers 19 into the radiator 22 in Mode 3, any coolant left in the radiator 22 will flow either directly to the tank 16 or through the intercooler subcooler 24 and the oil subcooler 46 or through an exterior connection to the radiator outlet of the valve (not shown) then to the tank 16. Coolant can flow either direction until it eventually returns to the coolant tank 16.

Figures 10, 11:
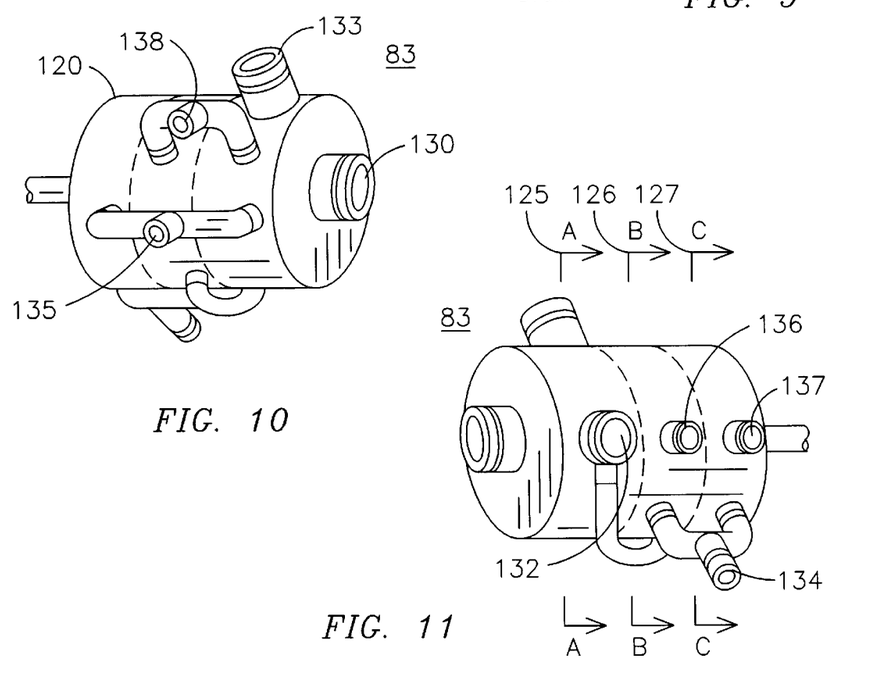
FIG. 10 is a perspective side view of a first side of a unified rotary valve.
FIG. 11 is a perspective side view of a second side of the unified rotary valve.

FIGS. 10–13 illustrate various views of an embodiment of an improved flow control valve 83 of the present invention. The illustrated embodiment of the flow control valve 83 is a rotary valve design containing an outer cylinder 120 and a rotatable rotor 122. The rotor 120 is a three-section, three-position rotary valve assembly. FIGS. 10 and 11 illustrate perspective views of opposite sides of the outer cylinder 120 of the rotary valve design. The rotary valve assembly 83 has three sections, a hot section 125, a warm section 126, and a cold section 127. Inlets 130, 136, 137 and outputs 132, 133, 134, 135, 138 are provided for directing coolant flow from the engine 13, to the radiator 22, to the tank 16, to the intercooler 28, from the intercooler subcooler 24, from the oil subcooler 46, and to the oil cooler 32.

Figure 12:
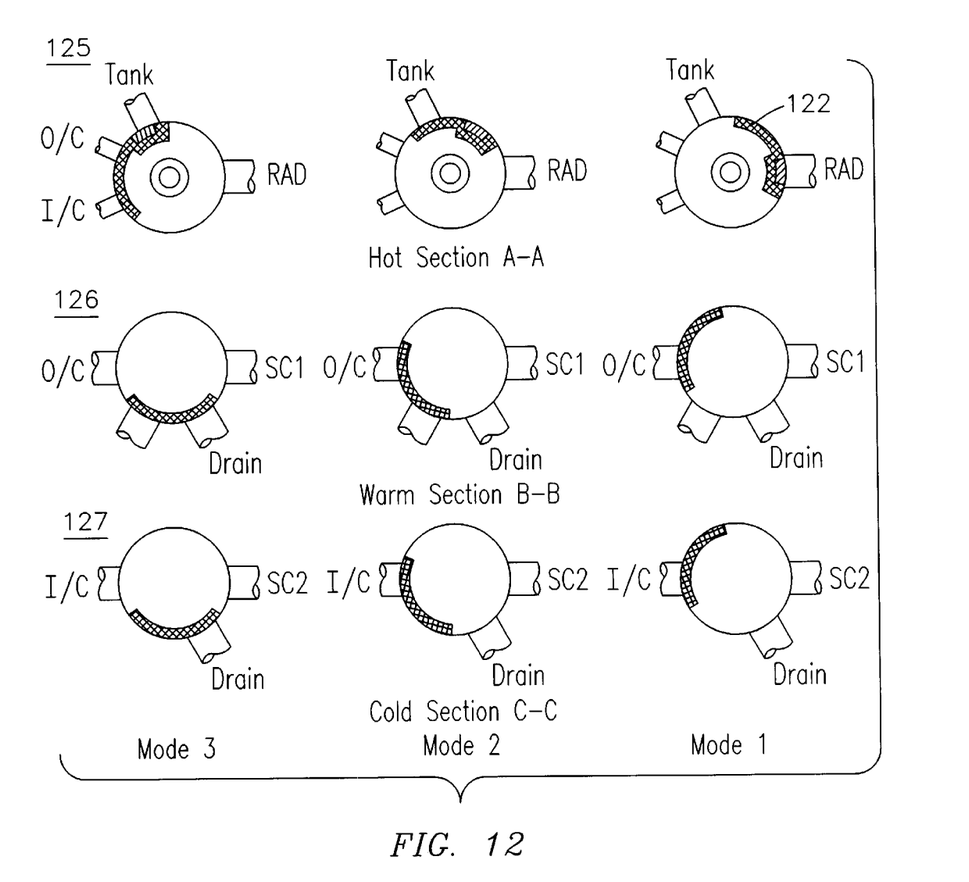
FIG. 12 is a matrix of cross sectional views of the unified rotary valve taken along sections A—A, B—B, and C—C.

FIG. 12 illustrates the three cross sections, A—A for the hot section 125, B—B for the warm section 126, and C—C for the cold section 127, illustrated in FIG. 11 along with the three internal rotor positions that may exist at each cross section in correspondence to Modes 1–3. As illustrated, the rotor 122 has a first position, a second position after 60 degrees rotation, and a third position after another 60 degrees rotation. Each position corresponds to one Mode of operation as previously discussed. One skilled in the art will recognize that in practice, the angle between positions may be other than 60 degrees and the three positions need not have equal angular separations.

Figure 13:
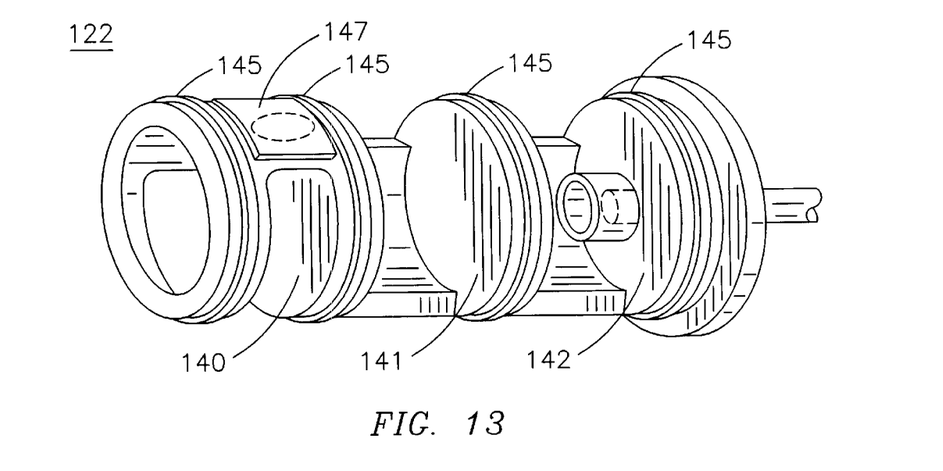
FIG. 13 a perspective side view of a rotor for use within a unified rotary valve for use in an enhanced split cooling system arranged in a manner contemplated by the present invention.

FIG. 13 illustrates a rotor disclosed in the current invention. The bulkheads 140, 141, 142 between rows are illustrative that this valve assembly 83 may be considered a five-port rotary valve, a four-port rotary valve, and a three-port rotary valve, all joined in a single housing and actuated by a common shaft (not shown). To assist the rotor 122 to turn smoothly, end seal bushings 145 may be used at the rotor outer diameter to allow a comparatively loose fit between the rotor and the cylindrical housing while holding the two parts in concentric orientation. Other seals, such as lip seals and "split ring" seals may be used at the outer diameter of the rotor to limit port-to port leakage. In another preferred embodiment, Teflon pads 147 along the outer diameter are applied.

While preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A cooling system for a turbo-charged internal combustion engine for a locomotive or off highway vehicle, said system comprising:
    (a) a coolant storage tank having an inlet and an outlet;
    (b) a coolant pump associated with said tank operable to circulate coolant through said cooling system;
    (c) an engine coolant jacket in heat transfer relationship with said engine having an inlet in fluid communication with said tank outlet and an outlet;
    (d) a combustion air intercooler having an inlet;
    (e) a radiator having an inlet and an outlet;
    (f) a single rotary control valve connected in fluid communication with said coolant jacket outlet, said intercooler inlet, said radiator inlet, said radiator outlet, and said tank inlet and controllable to operate in a plurality of flow connection modes for selectively regulating a flow of coolant throughout said jacket, intercooler, radiator and tank, and thus a temperature of said engine under varying engine operating and environmental conditions;
    (g) a liquid cooled turbo charger having an inlet in fluid communication with said tank outlet and an outlet;
    (h) an intercooler subcooler having a coolant input and output;
    (i) a lube oil cooler having a coolant input and output;
    (j) a lube oil subcooler having a coolant input and output;
    (k) wherein said single rotary control valve is further connected in fluid communication with said oil cooler inlet, said lube oil subcooler output, said intercooler subcooler inlet and said intercooler subcooler output and controllable to operate in a plurality of flow connection modes for selectively regulating a flow of coolant throughout said coolant jacket, turbo charger, intercooler, radiator, tank, oil cooler, oil subcooler, and intercooler subcooler and thus a temperature of the engine under varying engine operating and environmental conditions; and
    (l) wherein said single rotary control valve comprises a first flow communication mode connecting said coolant jacket outlet and said turbo charger outlet to said radiator inlet, connecting said oil subcooler outlet to said oil cooler inlet, and connecting said intercooler subcooler outlet to said intercooler inlet; a second flow communication mode connecting said coolant jacket outlet and said turbo charger outlet to said radiator inlet, said oil cooler inlet, and said intercooler inlet, connecting said oil subcooler outlet to said coolant tank inlet, and connecting said intercooler subcooler outlet to said coolant tank inlet; and a third flow communication mode connecting said coolant jacket outlet to said intercooler inlet, said oil cooler inlet, and said coolant tank inlet, connecting said radiator input to said coolant tank inlet, connecting oil subcooler outlet to said coolant tank inlet, and connecting said intercooler subcooler outlet to said coolant tank inlet.

2. The cooling system of claim 1, wherein said rotary control valve further comprises:
    (a) a cylinder having openings connected to said turbocharger outlet, said coolant jacket outlet, said intercooler inlet, said radiator inlet, said radiator outlet, and said coolant tank inlet;
    (b) a rotor disposed within said cylinder and having a plurality of sets of openings formed therein said rotor operable to be moved to a plurality of positions within said cylinder;
    (c) a first of said positions aligning said openings in said cylinder with a first set of opening in said rotor to form said first flow communication mode;
    (d) a second of said positions aligning said openings in said cylinder with a second set of opening in said rotor to form said second flow communication mode; and
    (e) a third of said positions aligning said openings in said cylinder with a third set of openings in said rotor to form said third flow communication mode.

3. A control valve for regulating flow of coolant throughout a cooling system for a turbo-charged internal combustions engine for a locomotive or off highway vehicle, said control valve comprising:
    (a) a cylinder having openings in fluid communication with a coolant jacket, intercooler, radiator, and coolant tank;
    (b) a rotor disposed within said cylinder and having a plurality of sets of openings formed therein said rotor operable to be rotated to a plurality of positions within said cylinder for regulating coolant flow between said control valve and said coolant jacket, said intercooler, said radiator and said coolant tank;
    (c) a first of said positions aligning said openings in said cylinder with a first set of openings in said rotor to form a first flow connection mode;
    (d) a second of said positions aligning said openings in said cylinder with a second set of openings in said rotor to form a second flow connection mode; and
    (e) a third of said positions aligning said openings in said cylinder with a third set of openings in said rotor to form a third flow connection mode.

4. The control valve of claim 3 wherein said first flow connection mode is formed by connecting an outlet for said coolant jacket in fluid communication with an inlet of said radiator, and connecting an outlet of said radiator in fluid communication with an inlet of said intercooler.

5. The control valve of claim 3 wherein said second flow connection mode is formed by connecting said coolant jacket outlet in fluid communication with said radiator inlet, and connecting said radiator outlet in fluid communication with an inlet to said coolant tank.

6. The control valve of claim 3 wherein said third flow connection mode is formed by connecting said coolant jacket outlet in fluid communication with said intercooler inlet and said coolant tank inlet, and connecting said radiator inlet and outlet in fluid communication with said coolant tank inlet.

7. An enhanced split cooling system for a turbocharged internal combustion engine including a liquid cooled turbocharger and an engine liquid coolant jacket, said system comprising:

(a) a coolant pump for pumping coolant from a coolant storage tank into heat exchange relationship with said engine jacket and said turbocharger;

(b) an oil cooler;

(c) an oil subcooler;

(d) a radiator;

(e) an intercooler operatively associated with said turbocharger for passing coolant in heat exchange relationship with compressed air in said turbocharger;

(f) an intercooler subcooler having an input and an output;

(g) a valve assembly actuated by an actuator wherein said valve assembly is in fluid communication with said coolant jacket, said turbo charger, said oil cooler, said oil subcooler, said intercooler, said intercooler subcooler, said radiator, said tank and independently operable for selectively directing coolant flow through said coolant jacket, turbo charger, oil cooler, oil subcooler, intercooler, intercooler subcooler, radiator, and tank under varying engine operating environmental conditions; and (h) wherein said valve assembly is operable in a mode wherein coolant flows from said engine and flows to said radiator, said oil cooler, and said intercooler, flows from said oil subcooler to said tank, and flows from said intercooler subcooler to said tank.

8. The system as set forth in claim 7 wherein aid valve assembly is operable in a first mode wherein coolant flows from said engine and flows to said radiator, said oil cooler, and said intercooler, flows from said oil subcooler to said tank, and flows from said intercooler subcooler to said tank.

9. The system as set forth in claim 7 wherein said oil cooler is a plate type heat exchanger.

10. The system as set forth in claim 7 wherein said radiator, said oil subcooler and said intercooler subcooler are horizontally disposed in parallel relationship.

11. The system as set forth in claim 7 wherein said oil cooler is a plate type heat exchanger and wherein said radiator, said oil subcooler and said intercooler subcooler are horizontally displaced in parallel relationship.

12. The system of claim 7 wherein said valve assembly is a four-port rotary valve.

13. The system of claim 7 where said valve assembly is a three-port rotary valve assembly.

14. An enhanced split cooling system for a turbocharged internal combustion engine including a liquid cooled turbocharger and an engine liquid coolant jacket, said system comprising:

(a) a coolant pump for pumping coolant from a coolant storage tank into heat exchange relationship with said engine jacket and said turbocharger;

(b) an oil cooler;

(c) an oil subcooler;

(d) a radiator;

(e) an intercooler operatively associated with said turbocharger for passing coolant in heat exchange relationship with compressed air in said turbocharger;

(f) an intercooler subcooler having an input and an output;

(g) a valve assembly actuated by an actuator wherein said valve assembly is in fluid communication with said coolant jacket, said turbo charger, said oil cooler, said oil subcooler, said intercooler, said intercooler subcooler, said radiator, said tank and independently operable for selectively directing coolant flow through said coolant jacket, turbo charger, oil cooler, oil subcooler, intercooler, intercooler subcooler, radiator, and tank under varying engine operating environmental conditions; and (h) wherein said valve assembly is operable in a mode wherein coolant flows from said engine and flows to said intercooler, said oil cooler, said tank, flows from said radiator to said tank, flows from said oil subcooler to said tank, and flows from said intercooler subcooler to said tank.

15. An enhanced split cooling system for a turbocharged internal combustion engine including a liquid cooled turbocharger and an engine liquid coolant jacket, said system comprising:

(a) coolant pump for pumping coolant from a coolant storage tank into heat exchange relationship with said engine jacket and said turbocharger;

(b) an oil cooler;

(c) an oil subcooler;

(d) a radiator;

(e) an intercooler operatively associated with said turbocharger for passing coolant in heat exchange relationship with compressed air in said turbocharger;

(f) an intercooler subcooler having an input and an output;

(g) a valve assembly actuated by an actuator wherein said valve assembly is in fluid communication with said coolant jacket, said turbo charger, said oil cooler, said oil subcooler, said intercooler, said intercooler subcooler, said radiator, said tank and independently operable for selectively directing coolant flow through said coolant jacket, turbo charger, oil cooler, oil subcooler, intercooler, intercooler subcooler, radiator, and tank under varying engine operating environmental conditions; and (h) wherein said valve assembly is a five-port rotary valve.

16. A control valve for regulating flow of coolant throughout a cooling system for an enhanced turbo-charged internal combustions engine for a locomotive or off highway vehicle, said control valve comprising:

(a) a cylinder having openings in fluid communication with to a turbocharger, a coolant jacket, an intercooler, a radiator, and a coolant tank;

(b) a rotor disposed within said cylinder and having a plurality of sets of openings formed therein said rotor operable to be rotated to a plurality of positions within said cylinder;

(c) a first of said positions aligning said openings in said cylinder with a first set of openings in said rotor to form a first flow communication mode;

(d) a second of said positions aligning said openings in said cylinder with a second set of openings in said rotor to form a second flow communication mode; and (e) a third of said positions aligning said openings in said cylinder with a third set of openings in said rotor to form a third flow communication mode.

17. The control valve of claim 16 wherein said first flow connection mode is formed by connecting an outlet for said coolant jacket and an outlet for said turbo charger to an inlet for said radiator, connecting an outlet for said oil subcooler to and inlet for said oil cooler, and connecting an outlet for said intercooler subcooler to an inlet for said intercooler inlet.

18. The control valve of claim 16 wherein said second flow connection mode is formed by connecting an outlet for said coolant jacket and said turbo charger outlet to said radiator inlet, said oil cooler inlet, and said intercooler inlet, connecting said oil subcooler outlet to said coolant tank inlet, and connecting said intercooler subcooler outlet to said coolant tank inlet.

19. The control valve of claim 16 wherein said third flow connection mode is formed by connecting said coolant jacket outlet and said turbo charger outlet to said intercooler inlet, said oil cooler inlet, and said coolant tank inlet, connecting said radiator input to said coolant tank inlet, connecting oil subcooler outlet to said coolant tank inlet, and connecting said intercooler subcooler outlet to said coolant tank inlet.

20. A method for controlling cooling of an internal combustion engine for a locomotive or off highway vehicle having a number of engine components receiving and discharging engine coolant via a single control valve assembly having a plurality of flow connection modes, the method comprising:
  (a) providing fluid flow connections between said engine and a cooling system comprising a coolant storage tank, a coolant pump, a radiator, and an intercooler;
  (b) connecting said control valve into said fluid flow connections to selectively open and block flow through the connections;
  (c) flowing a coolant from said cooling tank to a liquid coolant jacket of said engine;
  (d) flowing said coolant from said coolant jacket to a rotary valve assembly;
  (e) determining the relationship between an engine temperature operating range and the fluid flow connection mode of said valve assembly;
  (f) sensing the temperature of the engine; and
  (g) configuring said valve assembly to the selected fluid flow connection mode for controlling the cooling said engine.

21. The method of claim 20 wherein said engine further comprises a liquid cooled turbo charger and said cooling system further comprises an intercooler subcooler, a lube oil cooler and a lube oil subcooler.

22. The method of claim 20 wherein determining a temperature control operating mode further comprises selecting a mode that flows said coolant through said rotary valve assembly to said radiator when heat rejection requirements are greatest.

23. The method of claim 20 wherein determining a temperature control operating mode further comprises selecting a mode that minimizes a risk of damage to said engine during operation.

24. The method of claim 20 wherein determining a temperature control operating mode further comprises selecting a mode that is a cost effective operating mode.

* * * * *